United States Patent [19]
Simcoe et al.

[11] Patent Number: 5,265,257
[45] Date of Patent: Nov. 23, 1993

[54] FAST ARBITER HAVING EASY SCALING FOR LARGE NUMBERS OF REQUESTERS, LARGE NUMBERS OF RESOURCE TYPES WITH MULTIPLE INSTANCES OF EACH TYPE, AND SELECTABLE QUEUING DISCIPLINES

[75] Inventors: Robert J. Simcoe, Westborough; Robert E. Thomas, Hudson, both of Mass.

[73] Assignee: Digital Equipment Corporation, Maynard, Mass.

[21] Appl. No.: 542,856

[22] Filed: Jun. 22, 1990

[51] Int. Cl.⁵ ............................................. G06F 13/00
[52] U.S. Cl. ................................. 395/725; 395/325; 364/DIG. 1; 364/228.3; 364/228.7; 364/228.9; 364/231; 364/232.7; 364/236.2; 364/242.6; 364/242.7; 364/242.8; 364/242.92; 364/242.94
[58] Field of Search ................ 395/725, 325; 364/DIG. 1, 200

[56] References Cited

U.S. PATENT DOCUMENTS

| | | | |
|---|---|---|---|
| 4,648,029 | 3/1987 | Cooper et al. | 395/325 |
| 4,924,380 | 5/1990 | McKinney et al. | 364/200 |
| 4,947,368 | 8/1990 | Donaldson et al. | 395/325 |
| 4,953,081 | 8/1990 | Feal et al. | 395/325 |
| 4,979,099 | 12/1990 | Milia et al. | 395/325 |
| 5,142,682 | 8/1992 | Lemay et al. | 395/725 |

*Primary Examiner*—Michael R. Fleming
*Assistant Examiner*—Tariq R. Hafiz
*Attorney, Agent, or Firm*—A. Sidney Johnston; Barry N. Young

[57] ABSTRACT

A fast arbiter for handling a large number of types of resources with multiple instances of each type of resource is provided. During a first cycle a request logic circuit broadcasts a request for a preselected type of resource onto a broadcast medium. During a second cycle a grant logic circuit broadcasts a queue position onto the broadcast medium for the preselected type of resource. Also, during the second cycle the request logic circuit stores the queue position. After an asynchronous wait for an instance of the requested type of resource to become free, a third cycle begins wherein the first grant logic circuit broadcasts an indication that a free instance of the preselected type of resource is available. During a fourth cycle the requester is granted access to the free instance of the preselected type of resource.

33 Claims, 12 Drawing Sheets

FAST ARBITER HAVING EASY SCALING FOR LARGE NUMBERS OF REQUESTERS, LARGE NUMBERS OF RESOURCE TYPES WITH MULTIPLE INSTANCES OF EACH TYPE, AND SELECTABLE QUEUING DISCIPLINES

FIELD OF THE INVENTION

This invention relates to electronic system arbitration for one or more shared resources, and more particularly to systems having a large number of requesters, multiple instances of resources of different types and the requirement of fast arbitration.

BACKGROUND

In modern electronic systems, resource arbitration is often required to determine the order in which requesters will have access to shared resources. As the size increases in electronic systems, for example computer systems, or for a second example, communication systems including telephone systems, or for a further example, computer local area networks and wide area networks, the number of requesters becomes large and also the number of resources becomes large. The resources may be divided into distinct types with multiple instances of many of the types. Arbitration for the resources becomes more difficult as the number of requesters and the number of resources both become large.

Also, in computer communications the arbitration process must be fast because the connect time for transmission of a data packet may be only a few microseconds to a few milliseconds. And the arbitration must be fast enough to provide efficient switching for such short connect times.

The combination of fast arbitration for large numbers of requesters and resources puts a severe strain on arbiter design, and present arbiters are either too slow or do not scale well to large numbers of requesters and large numbers of resource types, each with multiple instances.

Examples of known arbitration systems follow.

As a first example of a known arbitration system, one type of resource arbitration is known as round-robin polling. In the round-robin polling scheme, all requesters for the shared resource are either logically or physically arranged into a ring. The arbiter polls the requesters in the order in which they are arranged in the ring. The arbiter grants access to the shared resource to the first requester in the ring which has an active request. When a requester has finished with the resource, the arbiter resumes polling at the next requester in the pre-established order. An example of a distributed round-robin polling scheme is a token-passing local area network such as IEEE standard 802.5.

As a second example of a known arbitration system, another type of resource arbitration is known as fixed-priority polling. This scheme is similar to round-robin arbitration except that when the shared resource becomes free, the polling of the requesters always restarts at a constant pre-designated point, i.e., the requester having the highest priority.

As a third example of a known arbitration system, this fixed priority polling is also done with "request snapshots" which attempt to prevent any particular requester from being unable to obtain access to a shared resource for an extended period of time. This can happen, for example, to low priority requesters in the fixed-priority polling scheme.

In the snapshot scheme, a "snapshot" of all outstanding requests is taken after all requests of a previous "snapshot" have been serviced. All of the requests in the "snapshot" are then serviced according to the designated polling discipline. Any new requests which occur during the time period after the "snapshot" is taken are inhibited or ignored until the next snapshot is taken. The request snapshot scheme guarantees that even the lowest-priority requester will be serviced so long as its request appears in a snapshot. Further, all requesters will each receive the shared resource no more than once per snapshot. An example of a distributed fixed-priority polling scheme with snapshots is the IEEE P1196 NuBus scheme.

As a fourth example of a known arbitration system, another arbitration scheme, called contention arbitration, permits one or more requesters to attempt to seize the shared resource at any time when the requesters perceive that the resource is available. A potential problem with this scheme, however, occurs when two or more requests collide with each other without anyone gaining access to the shared resource. Schemes have been developed to overcome this obstacle so that when a collision does occur, the requesters involved follow a designated policy for re-attempting their request. This policy can include waiting for a random time interval after the collision is over before regenerating the request. An example of contention arbitration is the IEEE 802.3 standard Ethernet Carrier-Sense-Multiple-Access/Collision-Detect scheme.

As a fifth example of a known arbitration system, a still further method of resource arbitration is known as queuing. In the queuing scheme, all requests are entered into a storage area called a queue. Requests are serviced from the queue according to a designated queuing discipline with the most common queuing discipline being a first-come, first-served policy. There are a variety of ways to implement a queue scheme, including the use of shift register memories, circular buffers, and linked lists.

Arbitration schemes are further classified as either centralized or distributed arbitration schemes. In a centralized scheme, requesters are separate from the arbiter and the arbiter is solely responsible for implementing the designated arbitration scheme. In distributed arbitration, however, the arbiter logic is distributed or divided throughout the system so that logic is closely associated with each requester and or each resource. Therefore, each requester is responsible for implementing a designated portion of the arbitration protocol. Both centralized and distributed arbitration schemes have advantages depending upon the specific application. The main differences are in the number and type of signal paths between requesters and the arbiter and in their fault tolerance characteristics.

All of these arbitration schemes, however, tend to be limited and are not acceptable either in rapid arbitration for computer communications or when used with a computer system having a large number of requesters and resources, or systems with multiple types of resources. For example, in prior arbitration schemes, when multiple resources having multiple instances were involved, multiple arbiters were frequently duplicated for each resource type, thereby increasing the cost and resulting in burdensome redundancy in the system.

SUMMARY OF THE INVENTION

There is provided a fast arbiter capable of being easily scaled to both large numbers of requesters and large numbers of types of resources where there are multiple instances of each type of resource, and also the arbiter has a selectable queuing discipline.

Apparatus for arbitrating access among a plurality of requesters and a plurality of types of resources, each type of resource having at least one instance, is provided by a request logic circuit coupled to each requester, thereby forming a plurality of request logic circuits; a grant logic circuit coupled to each instance of the plurality of types of resources, thereby forming a plurality of grant logic circuits; a broadcast medium for transferring information among the plurality of request logic circuits and the plurality of grant logic circuits.

During a first cycle request logic circuits provide a means, responsive to a selected one of the requesters desiring to use a preselected type of resource, for the request logic circuit coupled to the selected requester to broadcast a request for the preselected type of resource onto the broadcast medium.

During a second cycle grant logic circuits provide a means, responsive to the broadcast of the request, for a first grant logic circuit to broadcast queue position information on the broadcast medium for the preselected type of resource, and the queue position information for the preselected type of resource is hereinafter referred to as a first queue position information. Also, during the second cycle, there is a means, responsive to the broadcast of the first queue position information, for the request logic circuit coupled to the selected requester to store the first queue position information, the stored queue position information hereinafter referred to as a second queue position information.

After an asynchronous wait for an instance of the requested type of resource to become free, a third cycle begins wherein a means, responsive to an instance of the preselected type of resource becoming free and prepared to serve a requester, for a grant logic circuit, associated with the free instance, to broadcast on the broadcast medium an indication that a free instance of the preselected type of resource is prepared to serve a requester. The indication that a free instance of the preselected type of resource is prepared to serve a requester is hereinafter referred to as a third queue position information.

During a fourth cycle a means, responsive to the second queue position information and responsive to the third queue position information, grants access to the selected one of the requesters to use the free instance of the preselected type of resource.

In a first example a FIFO queuing discipline is provided by, the queue position information broadcast during the second cycle by the grant logic circuit and stored by the request logic circuit is a ticket number for the resource type, where the ticket number is generated sequentially in ascending order. During the third cycle the grant logic circuit broadcasts the next sequential ticket number to be served along with an indication of the resource type that is free. And all of the request logic circuits read the broadcast from the broadcast medium, and the one having a matching ticket number for the preselected type of resource notes this fact. During the fourth cycle access is granted through an access path.

In a second example also providing a FIFO queuing discipline, the queue position information broadcast during the second cycle by the grant logic circuit and stored by the request logic circuit is a queue length for the requested resource type. As another requester is a to the list of those waiting for that resource type, the queue length becomes one unit longer. During the third cycle the grant logic circuit broadcasts the identification of the resource type that has become available to serve a requester, and each request logic circuit waiting for that resource type decrements its stored queue length, and the one having the decremented value equaling a predetermined number notes that fact. In the fourth cycle access is granted to the requester to use the instance of the resource type, where the winning requester is the one having its decremented queue position equaling the predetermined number.

In a third example, the queue length is broadcast during the second cycle as in Example 2, however the queue lengths are incremented by the request logic circuits during the second cycle, thereby giving a last in first out, LIFO, queuing discipline.

The access path between the requester and the instance of the resource may be granted by enabling a crossbar switch. Alternatively, the access path may be a single wire bus, or may be a multiwire bus.

A subarbiter is used to arbitrate access to the broadcast medium for transfer of queue position information. In the event that several instances of the requested resource type are available to service a request, the subarbiter selects the instance that services the request as the instance that wins the arbitration for the broadcast medium.

Alternatively, the broadcast medium may comprise two multiwire buses, referred to as a request bus and a grant bus.

As a further alternative, the broadcast medium may have more than two buses.

As an aid to understanding the present invention, we now discuss an analogous method of distributed arbitration for arbitrating access to shared resources. A distributed arbitration scheme used for many years in retail stores such as, for example a bakery, operates as follows. Each customer takes a numbered ticket upon entering the bakery. There are a number of counters, the cookie counter, the bread counter, the doughnut counter. Each different counter represents a resource type. Each clerk working at a specific counter is an instance of the resource type of the counter. Each customer, or requester, for the cookie counter receives a queue number for the cookie counter, each customer for the bread counter receives a queue number for bread counter, each customer for the doughnut counter receives a queue number for the doughnut counter, etc. And the respective queue numbers may be written on color coded tickets, for example, a green ticket may represent the cookie counter, a red ticket may indicate the bread counter, a yellow ticket may indicate the doughnut counter, etc. That is, the ticket is color coded in order to indicate resource type. The ticket color is a resource type identification code.

There are various ways that the ticket numbers can be arranged, for example, there may be different color rolls for each counter with each roll being numbered in sequence.

The customer holds his ticket in his hand, keeps it in his pocket, memorizes the number, etc. The customer then waits asynchronously until his number is called from the appropriate counter, and he compares the called number with his ticket number in order to know that his number was called. The customer steps up to the counter, shows his ticket number, and access to the resource type is granted. There may be several clerks working at a counter, and each clerk is an instance of the resource of the counter. Since the customer does not care which clerk waits on him, the first available instance of the resource type handles his purchase.

An alternative queuing discipline may be selected by adopting a desired order in which numbers are called out. For example, favored customers may be given a priority status by having their ticket number called out first.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
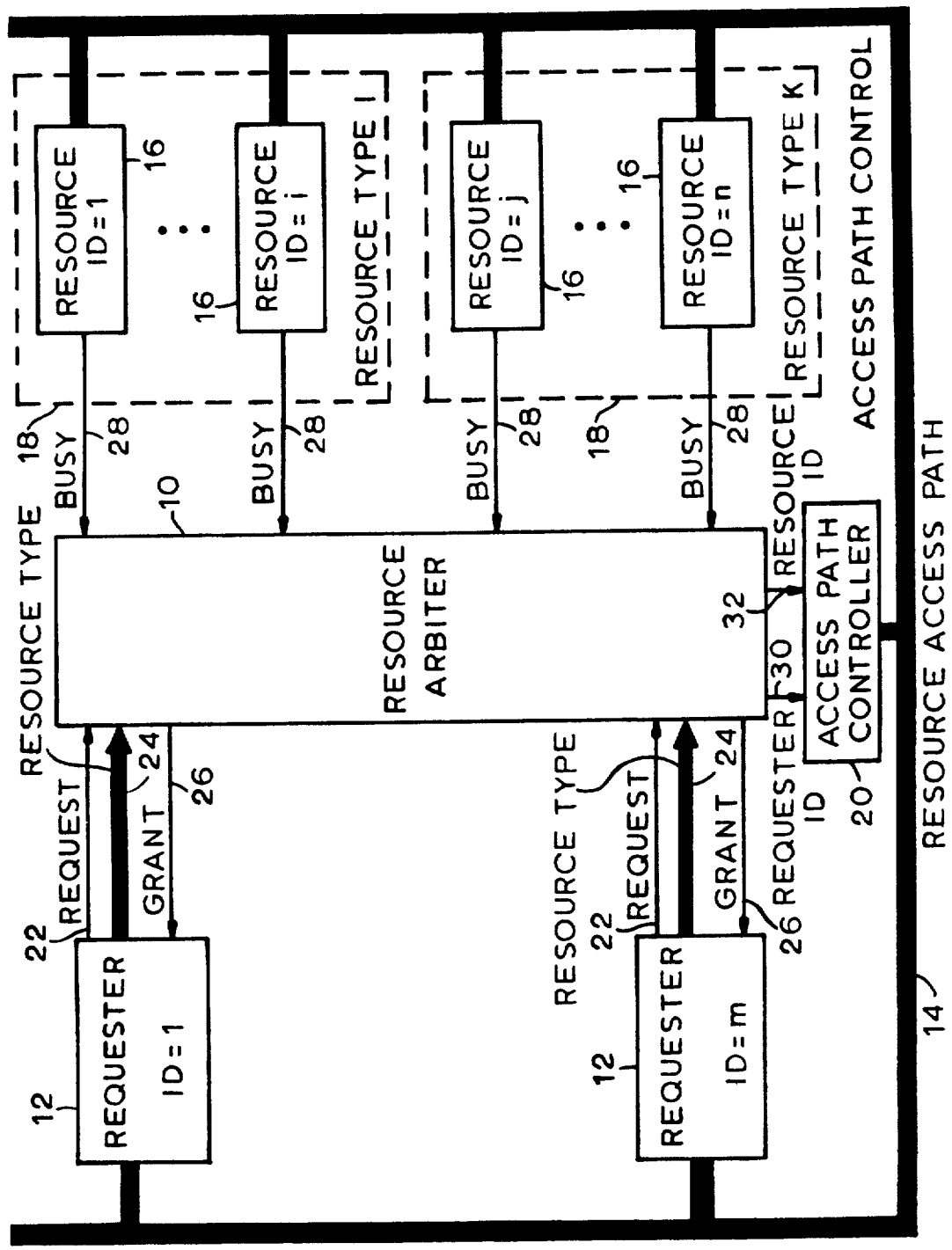
FIG. 1 is a block diagram of a system having an electronic arbitration mechanism constructed according to the present invention.
Figure 2:
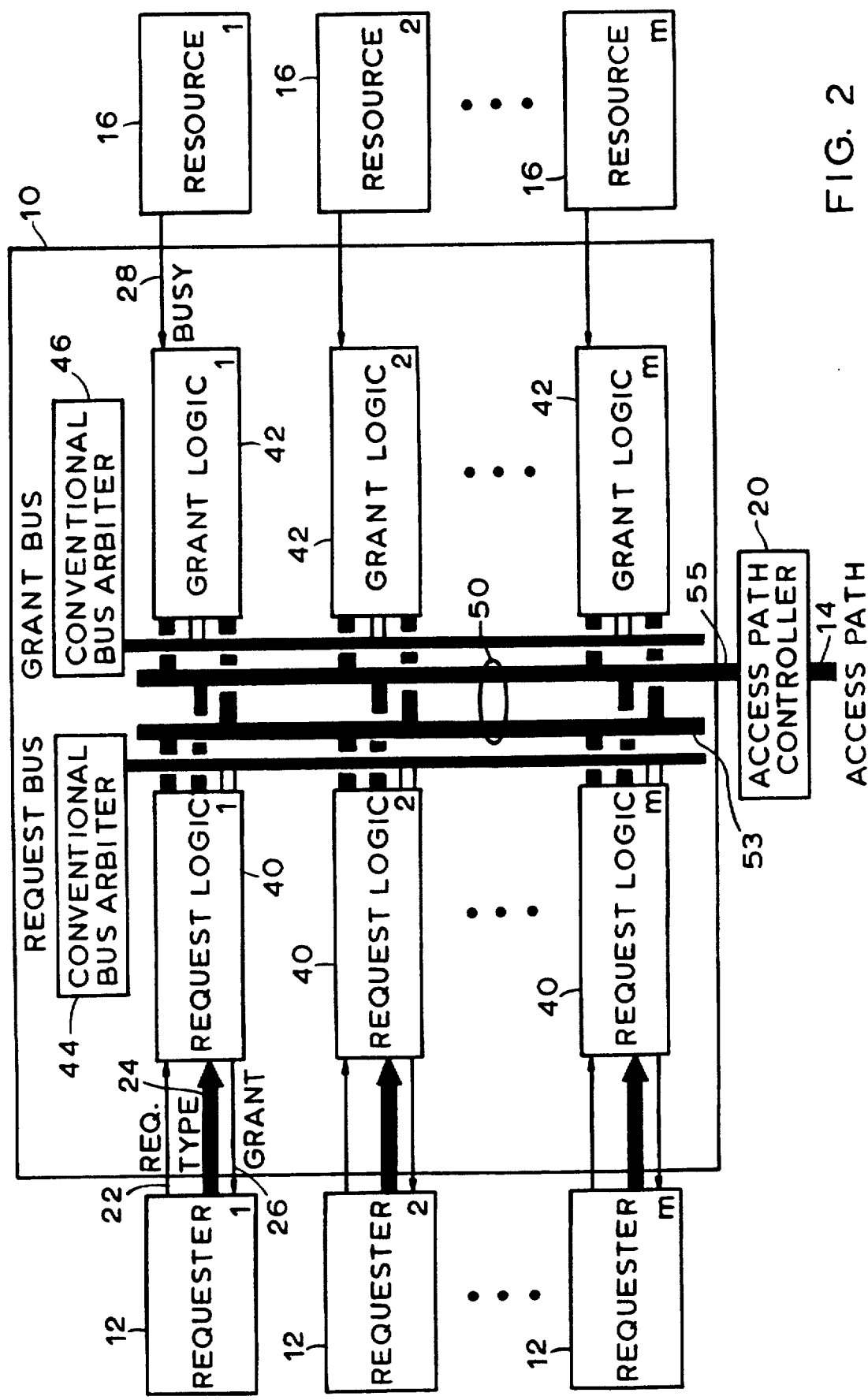
FIG. 2 is a detailed block diagram of the resource arbiter of FIG. 1.
Figure 3:
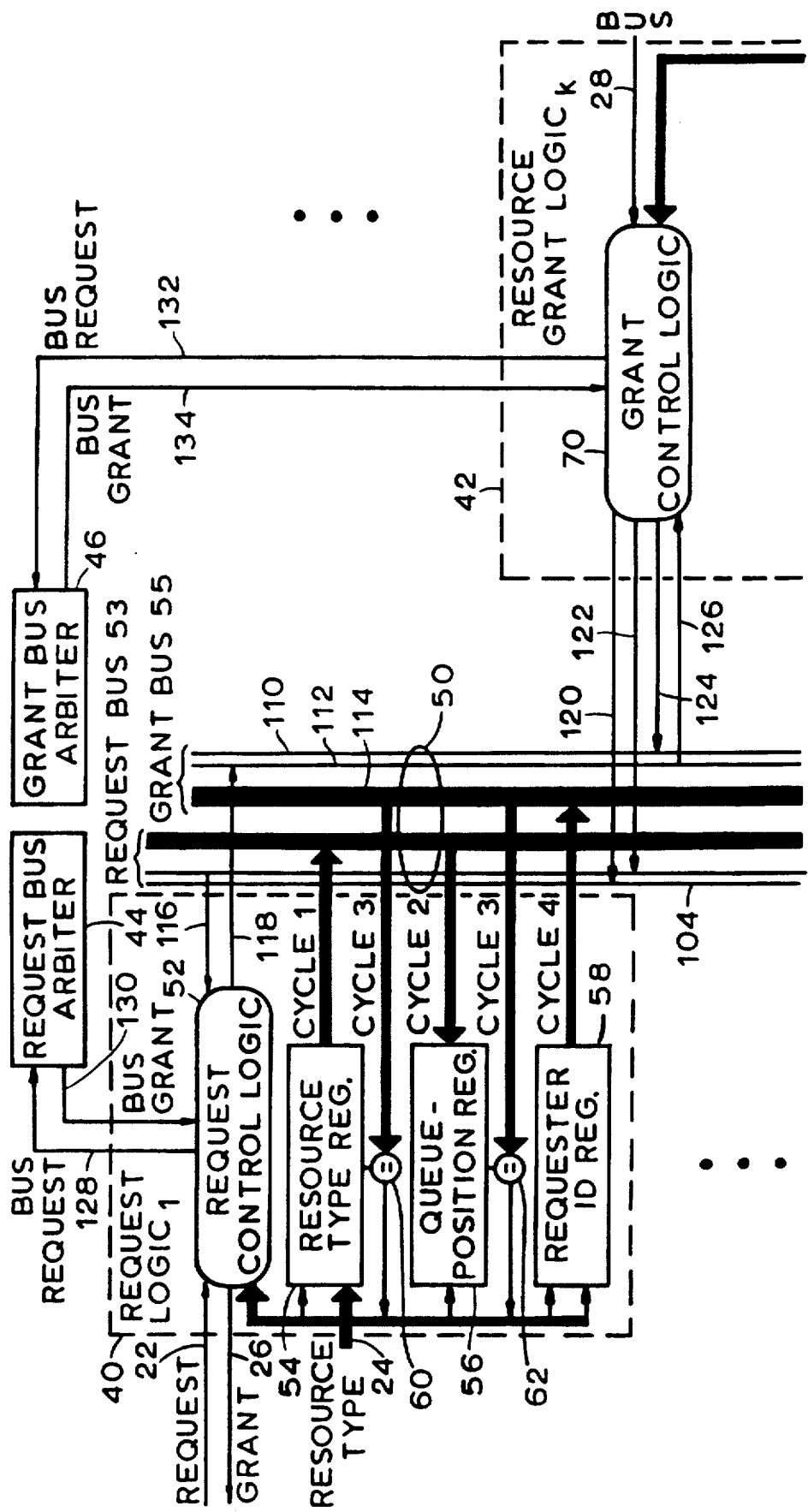
FIG. 3 is a detailed block diagram of the arbitration logic and arbitration cycles of FIG. 2.
Figure 3:
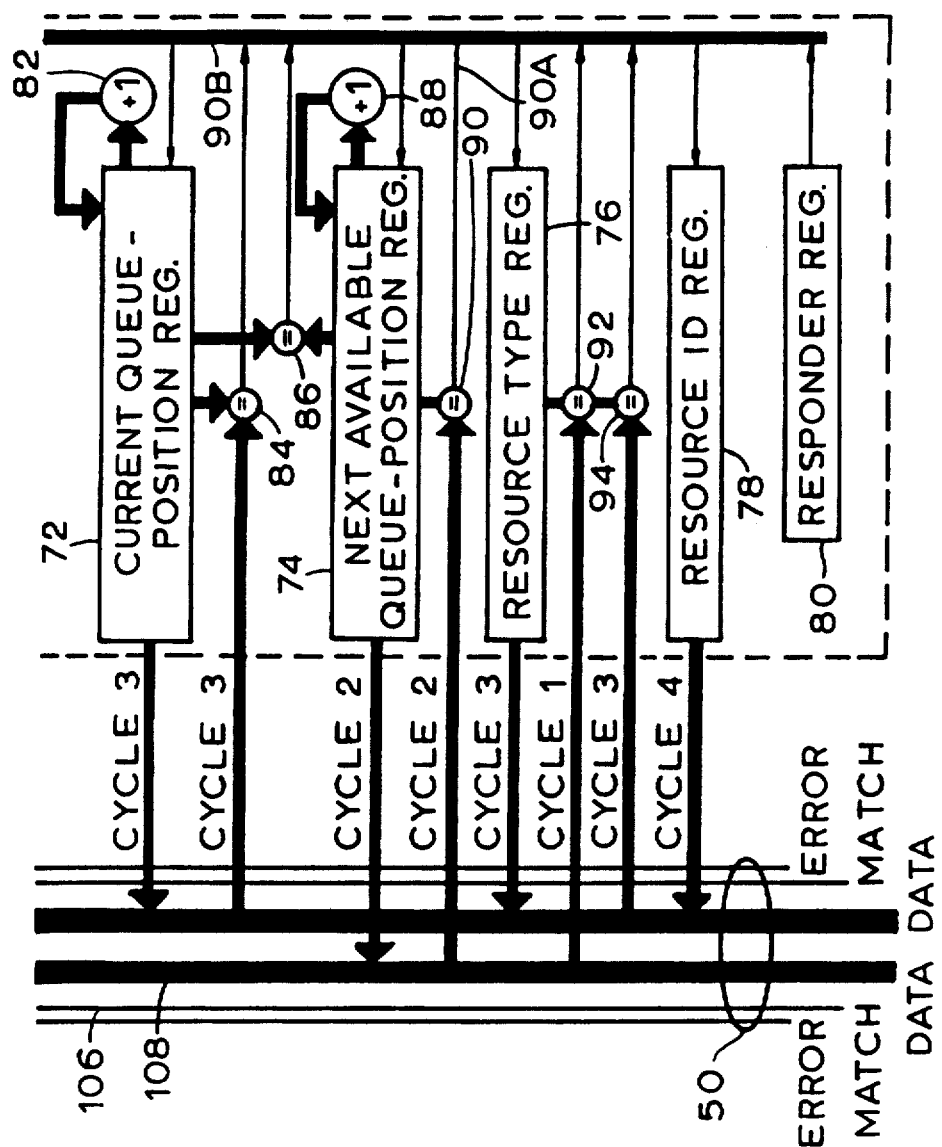

A first example of the invention is shown in FIG. 1 through FIG. 3.

Referring to FIG. 1, there is shown a block diagram of a system having an electronic arbitration mechanism according to the present invention. A plurality of requesters identified (ID) as 1 through "m" are coupled via a resource access path 14 to a plurality of resources 16 having ID's = 1 through "n". In the illustrated embodiment, the resource access path 14 comprises a shared bus to selectively couple any one of the requesters 12 to any one of the resources 16. The resources 16 can be grouped into resource types 18 identified as resource types 1 through "k". The resource types may be, for example, CPUs, storage devices and I/O devices or resources assigned particular tasks such as, for example, CPUs available for batch job processing, telephone hunt groups (also known as trunk groups), etc. As shown in FIG. 1, resource type 1 includes resources 16 having ID's = 1 through "i" and resource type k includes resources 16 identified as "j" through "n". A requester 12 can comprise any device coupled to the resource access path 14, such as a CPU, which wants access to a resource 16.

A distributed resource arbiter, shown generally as block 10, is coupled to the requesters 12 and resources 16. The resource arbiter 10 includes, in one embodiment, an access path controller 20. The resource arbiter 10 accepts requests from each of the requesters 12 for access to any of the resource types 18. The resource arbiter 10 provides source and destination information such as requester ID and resource ID information on lines 30 and 32, respectively, in a controlled order to the access path controller 20. The source and destination information enables the access path controller 20 to control the resources access path 14 to couple a selected requester 12 to a requested resource 16 after the granting of the resource request of the selected requester 12 by the resource arbiter 10.

Whenever a requester 12 requires access to a resource 16, it sends a request signal 22 along with the type of resource 24 requested to the resource arbiter 10. The resource arbiter 10 monitors the status of the resources 16 to determine if they are free or busy. The monitoring of the resources, status can be accomplished, for example, via a signal line 28 for each resource 16. Once the requester 12 has won the arbitration in the resource arbiter 10, a grant signal 26 is returned to the requester 12. At this time, as shown in FIG. 1, both the requester ID 30 and resource ID 32 are output from the resource arbiter 10 to the access path controller 20. The access path controller 20 then couples the requester 12 to the resource 16 via the resource access path 14.

Figure 1A:
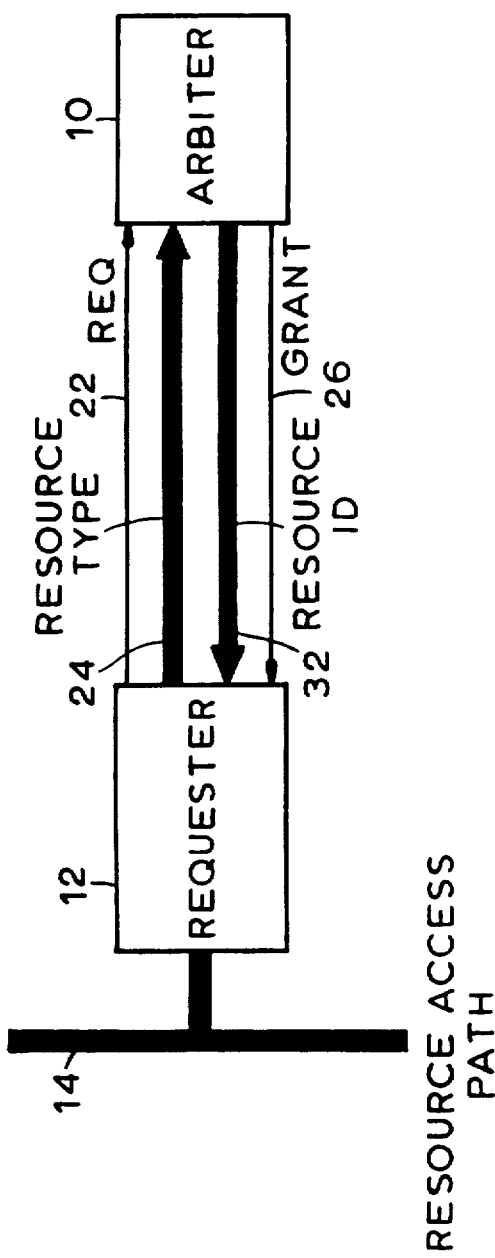
FIG. 1A is a block diagram of another embodiment of the system of FIG. 1.
Figure 1B:
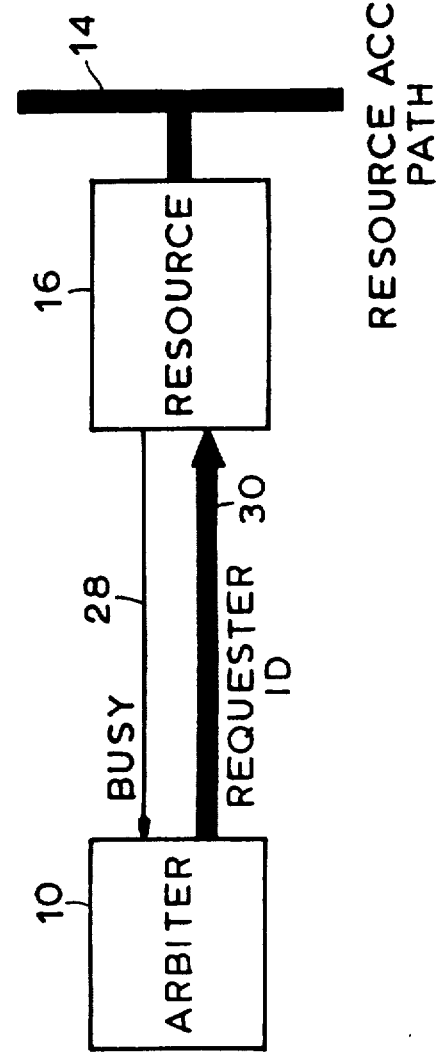
FIG. 1B is a block diagram of a further embodiment of the system of FIG. 1.

FIGS. 1A and 1B illustrate further embodiments of the system of FIG. 1 wherein either the requester 12 (FIG. 1A) or the resource 16 (FIG. 1B) is used to control the coupling of the requester 12 to the resource 16 over the shared access path 14 in place of the access path controller 20. FIG. 1A shows the resource arbiter 10 sending both the grant signal 26 and the resource ID 32 to the requester 12. In this method, the requester 12, having its own requester ID 30 (not shown) and the resource ID 32 can operate to directly access the resource 16 over the resource access path 14. Alternatively, as shown in FIG. 1B, the resource arbiter 10 sends the requester ID 30 to the resource 16. the resource 16, having its own resource ID 32 (not shown) and the requester ID 30, can operate to directly access the requester 12 over the resource access path 14.

Figure 1C:
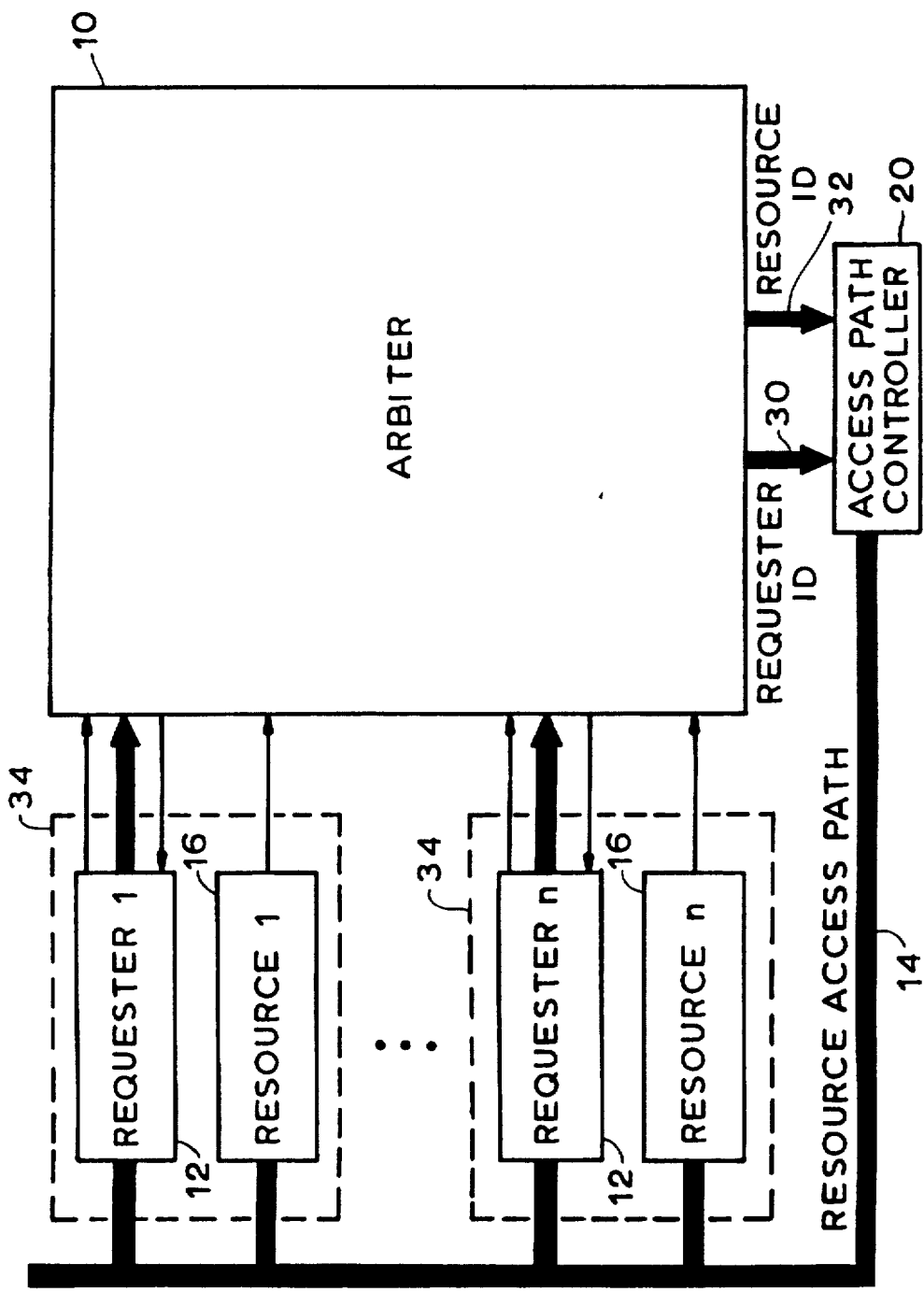
FIG. 1C is a block diagram of yet another embodiment of the system of FIG. 1.
Figure 1D:
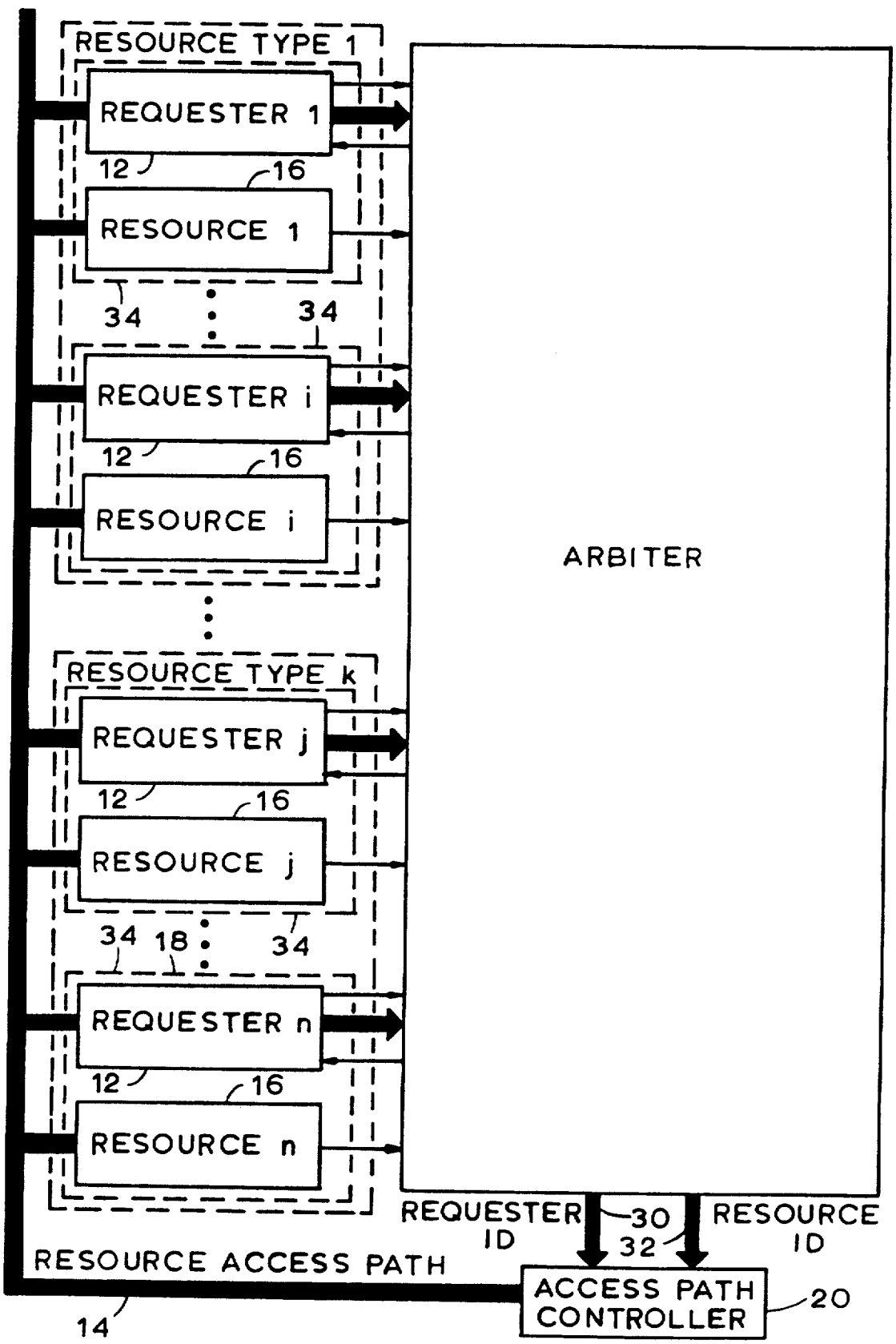
FIG. 1D is a block diagram of still a further embodiment of the system of FIG. 1.

FIG. 1C shows a block diagram of a further embodiment of the arbitration mechanism of FIG. 1. In FIG. 1C, associated groups 34 of one requester 12 with one resource 16 are shown. The groups 34 allow for the case wherein a user of the arbiter can be both a requester and a resource, e.g., a CPU, an I/O device, etc. FIG. 1D illustrates the case where the groups 34 can be of a particular resource type 18.

Referring to FIG. 2, there is shown a more detailed diagram of the resource arbiter 10. The resource arbiter 10 includes request logic blocks 40 and resource grant logic blocks 42. Each requester 12 is coupled to an associated request logic block 40 and each resource 16 is coupled to an associated grant logic block 42. The request and resource grant logic blocks 40 and 42, respectively, are further coupled to a common broadcast me 50. The request logic blocks 40 are also coupled to a conventional bus arbiter 44 while the resource grant logic blocks 42 are coupled to a conventional bus arbiter 46. These bus arbiters 44 and 46 are, for example, round-robin arbiters, fixed priority arbiters, polling with request snapshot arbiters, or any other well known type of arbiter.

The common broadcast medium 50, which will be described in more detail below, may be a single bus, a plural bus, an Ethernet, a token ring structure, etc. FIG. 2 shows a dual bus structure 53 and 55. The bus 53 operates as a request bus and the bus 55 operates as a grant bus during the various cycles of the arbitration, as will appear. When a single bus is used, the request signals and grant signals would be multiplexed onto the single bus structure. Moreover, a single bus structure could be used in place of the common broadcast medium 50 and the resource access path 14 with all of the signals relating to requests, grants and communications between the requesters and resources being multiplexed onto the single bus structure as will be described in more detail below.

The resource 10 may be in a single component arranged adjacent the resource access path 14 or distributed on a series of different logic boards, e.g., one per requester/resource, with each logic board located near its associated requester/resource.

The operation of Example 1 of the invention is summarized in the upper entry of Table 1. Referring to Table 1, during Cycle 1 the requester broadcasts on the broadcast medium an indication of the resource type that the requester desires to use. This broadcast is done after a subarbiter grants access to the broadcast medium to the requester.

During Cycle 2, the grant logic of the requested resource type then immediately broadcasts, after being granted access by the subarbiter to the broadcast medium, a ticket number. Also during Cycle 2, the request logic stores the ticket number as a stored ticket number.

An asynchronous wait then occurs as an instance of the resource type finishes serving a previous request, and thereby becomes ready to serve another requester.

Cycle 3 then begins with a grant logic circuit, associated with the free instance of the resource type, broadcasting, after being granted access by a subarbiter to the broadcast medium, the current serving number and an indication of the resource type. Also during Cycle 3 all request logic circuits listen to the broadcast medium, and those waiting for the resource type indication contained in the broadcast compare their stored ticket number with the current serving number. The one request logic circuit having a match notes that fact.

During Cycle 4 access by the requester to the available instance of the requested resource type is granted. The grant of access is facilitated by the Path Controller having available the Requester ID and the Resource ID.

TABLE 1

| | | CYCLE TABLE | | |
|---|---|---|---|---|
| Example | Cycle 1 | Cycle 2 | Cycle 3 | Cycle 4 |
| Ex. 1 | Requester Broadcasts Resource Type | Grant Logic Broadcasts Ticket Number | Grant Logic Broadcasts 1. Current Serving Number 2. Resource Type | The Requester ID and Resource ID are available to the Path |
| | (desired type) | | | |
| | | Request Logic Stores Ticket No. (stored ticket No) | All Request Logic Units Compare Both stored ticket No with | Controller, and so the Access Decision |
| | | (modulo a number larger than the number of requesters) | Current Serving No and Resource Type with desired type And The Matching One Carries Out Cycle 4 | Is Implemented |
| Ex.2 | Requester Broadcasts Resource Type | Grant Logic Broadcasts Queue Position for Next Customer | Grant Logic Broadcasts Resource Type | The Requester ID and Resource ID are available to the Path |
| | | Request Logic Stores Queue Position (stored queue pos) | All Request Logic Units waiting for that Resource Type | Controller, and so the Access Decision |
| | | (length of line waiting for the requested resource type) | Decrement stored queue pos And Compare Result of Decrementing with a fixed number And The Matching One Carries Out | Is Implemented |

TABLE 1-continued
CYCLE TABLE

| Example | Cycle 1 | Cycle 2 | Cycle 3 | Cycle 4 |
|---------|---------|---------|---------|---------|
|         |         |         | Cycle 4 |         |

FIG. 3 shows an example in block diagram form of a request logic block 40 coupled to the common broadcast medium 50 and operating to request a particular resource through a resource grant logic block 42 associated with the resource type desired by the requester. The signals and cycle connections utilized in processing a request by the resource arbiter are also shown in FIG. 3.

The request logic block 40 includes a request control logic device 52, a resource type register 54, a queue position register 56 and a requester ID register 58. Comparators 60 and 62 are coupled to the resource type register 54 and the queue position register 56, respectively. A request bus arbiter 44 is further coupled to the request control logic device 52 in the request logic block 40. The request control logic device 52 has a control input to each of the registers 54, 56, 58.

Alternatively, queue position register 56 may be called a "ticket number" register in order to emphasize the point that the number stored therein represents a ticket number for use by the type of resource requested. The ticket number is a number that is given out by the grant logic circuits. The ticket number is selected modulo a number larger than the longest queue length desired.

The resource grant logic block 42 includes a grant control logic device 70, a current queue position register 72, a next available queue position register 74, a resource type register 76, a resource ID register 78 and a responder register 80. The resource type register 76 stores resource type information identifying the type of resource coupled to the grant logic block 42. The resource ID register 78 contains the information that uniquely identifies the actual resource component 16 which is coupled to the grant logic block 42. Further, comparators 84, 86, 90, 92 and 94 are coupled to the registers inside the resource grant logic 42 as illustrated in FIG. 3. Also, increment logic devices 82 and 88 are coupled to the current queue position register 72 and next available queue position register 74, respectively.

Alternatively, current queue position register 72 may be called a "currently serving number register" in order to emphasize the point that the resource type is ready to serve the value from this register that is broadcast on the grant bus 55.

Also alternatively, next available queue position register 74 may be called a "next available ticket number register" in order to emphasize the point that the value broadcast on request bus 53 during cycle 2 is the next ticket number that the resource type has available to issue.

A grant bus arbiter 46 is coupled to the grant control logic device 70. Further, the grant control logic device 70 has a control input to each of the registers 72, 74, 76, 78, 80 in the resource grant logic block 42.

The common broadcast medium 50 includes a request bus 53 and a grant bus 55. The request bus 53 further has a data line 108, which may include plural lines, a match line 106 and an error line 104. Similarly, the grant bus 55 includes a data line 114, which again can be a plurality of lines, a match line 112, and an error line 110. The error and match lines 104, 106, 112 and 110 function as control lines for the data lines 108 and 114 of the request and grant buses 53 and 55, respectively. The control lines for the request and grant buses 53 and 55 send and receive signals from the request control logic device 52 and grant control logic device 70.

The operation of the electronic distributed resource arbitration mechanism will now be described with reference to FIG. 3. The queuing discipline obtained by the example shown in FIG. 3 is a First In First Out (FIFO) arrangement. In operation, a requester 12 (see FIG. 2) sends a request signal 22 to the associated request control logic device 52 in the resource arbiter 10. Upon receipt of the request signal 22, the request control logic device 52 latches the resource type 24 output by the requester 12 into the resource type register 54.

At this time, the request control logic device 52 sends a bus request signal 128 to the request bus arbiter 44. As described above, the request bus arbiter 44 can be any well known type of arbitration mechanism. For example, a round robin arbitration scheme can be used to prevent any particular requester from losing arbitration attempts for an extended period of time. Upon winning the arbitration, a bus grant signal 130 is sent to request control logic device 52 whereupon the request logic block 40 obtains control of the request bus 53.

The request logic block 40 then begins arbitration using a 4-cycle operation. During the first cycle (Cycle 1), the resource type stored in the resource type register 54 is placed on the request bus 53 data line 108. During the same cycle, the grant logic block 42 at each resource of each resource type monitors the request bus 53 to receive the resource type from data line 108 for input into the comparator 92. The comparator 92 compares the resource type received from the data line 108 to the resource type information stored in the resource type register 76 of the grant logic block 42. This comparison is simultaneously done by all resource grant logic blocks 42 coupled to the broadcast medium 50. However, only those grant logic blocks 42 of the same resource type will match the resource type information placed on the data line 108 by the request logic block 40. The comparator 92 sends a match/no match signal to the grant control logic device 70. Only those resource grant logic blocks 42 with a match signal continue with cycle 2.

Because each resource type can include multiple resources, the responder register 80 designates which resource grant logic block 42 within the resource type will output the match signal to the request bus 53. The designation of a responder within a type is arbitrarily established when the arbiter is initialized. At that time, exactly one responder requester 80 must be set within all resource grant logic blocks 42 comprising the same resource type.

During the second cycle (Cycle 2), the responding grant control logic device 70 asserts a match signal 122 on the match line 106 of the request bus 53. At the same time, the number stored in the next available queue position register 74 is placed onto the data line 108 of the request bus 53. The request control logic device 52 receives the match signal 116 and latches the next available queue position which was placed on data line 108 of request bus 53 into the queue position register 56.

Also during cycle 2, each of the resource grant logic blocks 42 within the requested resource type, operates the comparator 90 to compare the next available queue position number placed on the request bus data line 108 against the number stored in its associated next available queue position register 74. The result of this comparison is sent to the grant control logic 70 to inform the resource grant logic device whether an error has been encountered, i.e., whether the number in its next available queue position register 74 matches the number placed on the data line 108. If any of the resource grant logic blocks 42 determines that an error has occurred, then that grant control logic device 70 sends an error signal 120 to the error line 104 of the request bus 53. The monitoring of the responding resource grant logic block 42 by the non-responding grant logic blocks 42 within the same resource type provides a necessary error detection method.

Once the error check is completed, the next available queue position register 74 for each grant logic block 42 within the resource type is then incremented by the increment logic device 88 to increase the number in the corresponding next available queue position register 74 by one to provide the next queue position number for the next request directed to this resource type.

The first two cycles are initiated by one of the request logic blocks 40 and occur on the request bus 53. Cycles 3 and 4 are initiated by one of the resource grant logic blocks 42 and occur on the grant bus 55.

To service any outstanding requests, the comparator 86 continuously compares the number stored in the current queue position register 72 against the next available queue position register 74. Whenever there is a difference between registers 72 and 74, i.e. indicating there is a request to service, then the grant control logic device 70 checks the status line 28 from its associated resource 16 (See FIG. 1). Once at least one of the grant control logic devices 70 receives a not busy status signal on line 28 indicating that the associated resource is available to service a request, and there is an outstanding request to be serviced as indicated by the comparator 86, the grant control logic device 70 associated with the available resource requests access to the grant bus 55. Arbitration among available resources to service the next outstanding request is accomplished by the grant bus arbiter 46 receiving a bus request signal 132 from the grant control logic device (devices) 70 and delivering a bus grant signal 134 to the grant control logic 70.

It is possible that more than one resource within a requested resource type will have a not busy status signal. In this case, each resource grant logic block 42 arbitrates for the grant bus 55. The winning resource grant logic block 42 will be the one resource of the requested resource type to couple with the requester. For example, if "CPU" is a resource type and several CPU's are currently available, the grant logic block 42 of each CPU will request access to the grant bus 55. The grant bus arbiter 46 selects which CPU will drive the grant bus 55 and therefore which CPU will provide the requested CPU service next. Again, as noted above, the grant bus arbiter 46 may be any well known arbitration scheme and is preferably a replication of the request bus arbiter 44.

Upon receiving a bus grant signal 134, the third cycle (Cycle 3) in servicing the request begins. The grant control logic device 70 that wins the arbitration operates to place each of the current queue position number from register 72 and the resource type information from the register 76 onto the grant bus 55 data line 114. The data line 114 can have a sufficient number of individual lines to accommodate both the current queue position number and the resource type information at the same time. Each of the other resource grant logic blocks 42 uses its comparator 94 to compare the resource type information on the data line 114 with the resource type information stored in its register 76. All of the resource grant logic blocks 42 within the same resource type, i.e. those resource grant logic blocks 42 whose comparators 94 indicated a match, compare the current queue position number against the number stored in their register 72 using comparator 84. If any inconsistency is found, then the grant control logic device 70 sends an error signal 124 onto the grant bus 55 error line 110. The error signal can be used to reset all of the registers and restart the resource arbitration mechanism.

All of the request logic blocks 40 monitor the grant bus 55 and receive the current queue position number and resource type number from the responding resource grant logic block 42 during the third cycle. Comparators 60 and 62 in the request logic blocks 40 compare the resource type number and current queue position number from the grant bus data line 114 against the numbers stored in the resource type register 54 and the queue position register 56, respectively. If both of these registers record a match of their respective resource type and queue position numbers, then the request control logic device 52 sends a match signal 118 onto the grant bus 55 match line 112.

During the fourth cycle (Cycle 4), each grant logic block 42 which matched the resource type in cycle 3 operates the increment logic device 82 to increment the number in the current queue position register 72. Also, in cycle 4, the request logic block 40 which drove the match line 112 places the requester ID register 58 onto the grant bus data line 114. The grant logic block 42 which won the arbitration to initiate cycle 3 places its resource ID register 78 onto the grant bus 55 data lines 114. The data lines 114 are wide enough to accommodate both the requester ID and the resource ID.

If there is no match on cycle 3, the information on the data lines 114 on cycle 4 is not meaningful.

The request logic block 40 which matched on Cycle 3, sends a grant signal 26 to the requester 12 (See FIG. 1). Because both the requester ID and resource ID are on the grant bus 55 on Cycle 4, the connection from requester to resource can be made over the resource access path 14 via any one of the embodiments illustrated in FIGS. 1, 1A and 1B. More specifically, the connection between the requester and the resource through the resource access path can be made by the access path controller 20, the requester 12, or the resource 16 depending upon which component receives the requester ID and the resource ID information.

It should be clear that the example of FIG. 3 describes only a single request for a particular resource type and that the number of requests for various resource types through the resource arbiter 10 can be very large while having a very fast response. In particular, with two buses each handling two cycles of the connection sequence, the number of arbitrations per second that can be accomplished is $1/(2N)$ where $N$ = time for one bus cycle. If $N = 200$ Ns the number of arbitrations achievable is 2.5 million/sec.

Figure 3D:
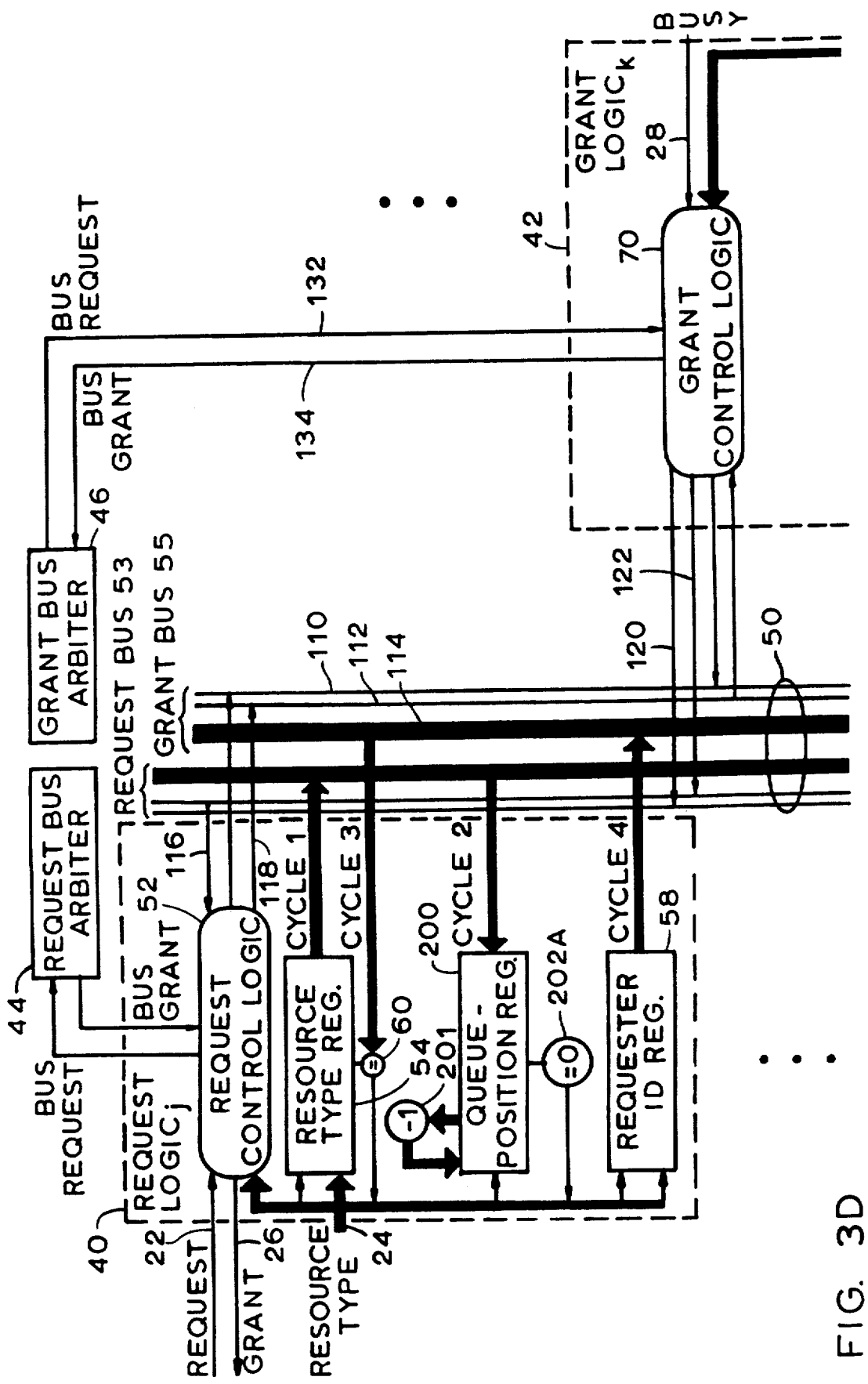
FIG. 3D is a detailed block diagram of another embodiment for the arbitration logic and arbitration cycles of FIG. 2.
Figure 3D:
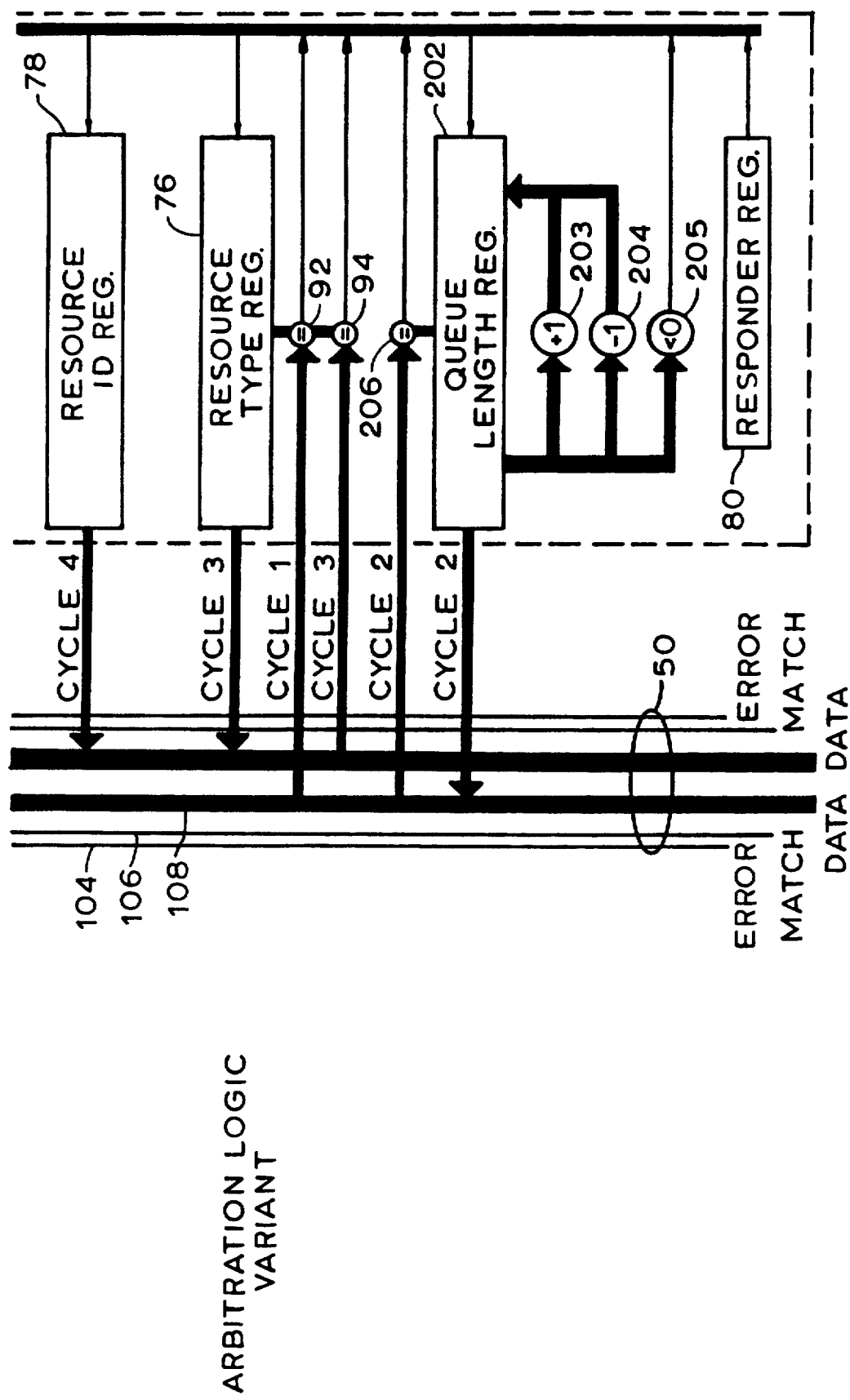

A second example of the invention is shown in FIG. 3D. The example of the invention shown in FIG. 3D also is a First In First Out queuing discipline. Referring now to FIG. 3D, there is illustrated a further embodiment for the requester logic block 40 and resource grant logic block 42 according to the present invention. The embodiment of FIG. 3D is similar to the embodiment of FIG. 3 except that the queue position register 56 and its associated comparator 62 of the request logic block 40 are replaced with a request queue position register 200. The request queue position register 200 is coupled to each of the request control logic device 52 and the data line 108 of the request bus 53 and to a decrement logic device 201 and a comparator 202A. The comparator 202A is also coupled to the request control logic device 52.

Moreover, the current queue position register 72 and the next available queue register 76 of the resource grant logic 42, as well as the associated increment logic devices 82, 88 and comparators 84, 90 are replaced by a single queue length register 202. The queue length register 202 is coupled to the data line 108 of the request bus 53 and the grant control logic 70. The queue length register 202 is also coupled to each of an increment logic device 203, a decrement logic device 204 and a comparator 205. The comparator 205 is also coupled to the grant control logic 70.

In the operation of the distributed resource arbitration mechanism illustrated in FIG. 3D the flow of information on the request bus 53 and grant bus 55 generally follows the cycle sequence of the distributed resource arbitration mechanism illustrated in FIG. 3. The request logic blocks 40 and grant logic blocks 42 must arbitrate for the request bus 53 and grant bus 55 respectively, as in the embodiment of FIG. 3.

However, with each new resource type request placed on the request bus 53 by a request logic device 40 during cycle 1, each grant control logic device 70 uses its comparator 92 to compare the resource type information on the grant bus 53 with the resource type information stored in the register 76. If there is a match, the grant logic device 70 operates the increment logic device 203 to increment the number stored in the queue length register 202 to indicate that there is now one more outstanding request for the resource type. During cycle 2, the grant control logic device 70 of the designated responder resource of the resource type causes the queue length register 202 to place the incremented queue length number stored therein onto the data line 108 of the request bus 53, rather than the next available queue number, as in the embodiment of FIG. 3. The request queue position register 200 of the request logic device 40, which is coupled to the data line 108, receives and store the queue length number placed on the data line 108 during cycle 2. At this time, all of the grant logics 42 for the same type of resource compare the number in their queue length register 202 with the number placed on the data line 108 using a comparator 206 to check for errors, as in the operation of the arbitration mechanism of FIG. 3.

During cycle 3, a grant logic device 42 whose associated queue length register 202 contains a number greater than zero, as indicated by the comparator 205 and whose resource is not busy arbitrates for the grant bus 55. Upon winning the arbitration, the grant control logic 70 puts the resource type information stored in the register 76 onto the data line 114 of the grant bus 55. At the same time, each request logic device 40 must monitor the grant bus 55 for each broadcast of resource type information and use the comparator 60 to compare the resource type information on the bus 55 with the resource type information stored in the register 54. The request control logic device 52 of each request logic 40 having a match operates to control the decrement logic device 201 to decrement the number in the request queue position register 200. Each request grant logic 52 having a match for the resource type information must then operate the comparator 202A to compare the number currently stored in the request queue position register 200 to zero. The request control logic 52 that finds the number in its request queue register 200 to be equal to zero asserts a match signal on the match line 112 of the grant bus 55.

The grant control logic device 70 of each resource grant logic device 42 of the requested resource type also operates to cause the decrement logic device 204 to decrement the number in the queue length register 202 to reflect the completion of the servicing of a request. The comparator 205 compares the decremented number to zero, and if the number is less than zero, the grant control logic 70 asserts an error signal on error line 110.

During cycle 4 the contents of the requester ID register 58 of the request logic block which drove the match line 112 on cycle 3 is placed on data line 114 of the request bus 53 and the contents of the resource ID register 78 of the grant logic winning the arbitration on cycle 3 is placed on the data line 114 of the grant bus 55 to enable the coupling of the requester 12 to the resource 16 through the resource access path 14 (See FIGS. 1, 1a, 1b).

The lower entry in Table 1 summarizes operation of the second example of the invention. Refer now to the lower entry in Table 1. As in Example 1, during Cycle 1 a requester broadcasts, after being granted access to the broadcast medium by a subarbiter, a request for a resource type.

Cycle 2 then begins, and a designated grant logic circuit broadcasts a queue position for a next customer. This queue position is the length of the line of requests waiting for the requested resource type. Also during Cycle 2, the request logic circuit reads the queue position from the broadcast medium and stores it as a stored queue position.

An asynchronous wait then takes place while an instance of the requested resource type finishes a previous request and becomes available to serve another requester. Cycle 3 begins when an instance of the requested resource type becomes available to serve another requester, and the designated grant logic circuit broadcasts, after being granted access to the broadcast medium by a subarbiter, an identification of the resource type. All request logic circuits listen to the broadcast medium, and all request logic circuits waiting for that particular resource type decrement their stored queue position. The decremented result is compared with a fixed number, and the one request logic circuit having a match notes that fact.

Then during Cycle 4 access of the requester to the available instance of the requested resource type is granted.

Figure 4:
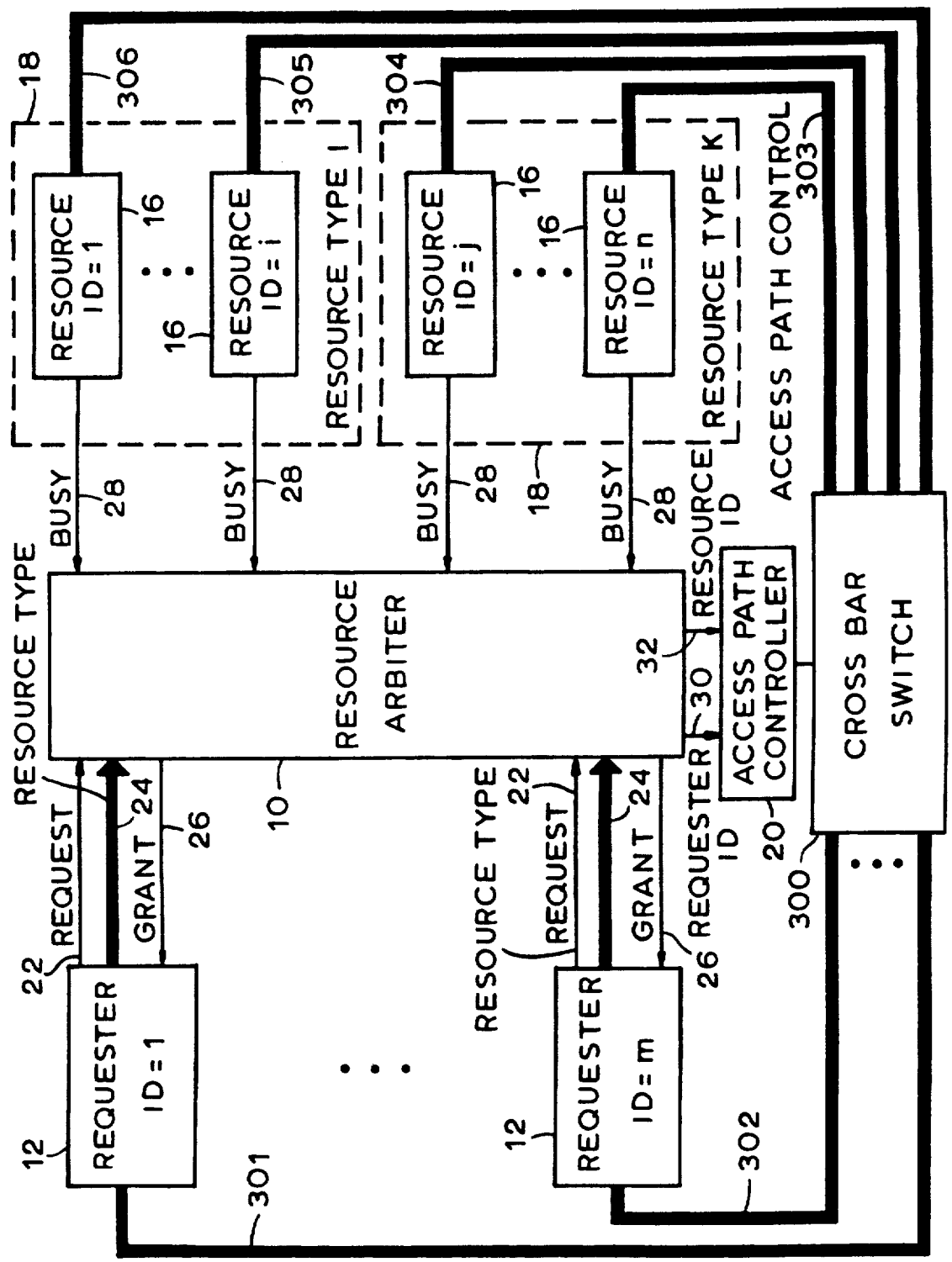
FIG. 4 is a block diagram of a system having an electronic arbitration mechanism and a cross bar switch coupling the requesters to the resources.

Referring now to FIG. 4, there is illustrated another embodiment of the arbitration system. The system of FIG. 4 is identical to the system of FIG. 1 except that the resource access path comprises a crossbar switch 300 to provide a point-to-point coupling from any requester 12 to any resource 16 via buses 301, 302 and buses 303, 304, 305, 306. The system of FIG. 4 processes requests as in cycles 1-4 of either of FIGS. 3 or 3A, as described above. However, in this embodiment, during cycle 4, the requester ID and the resource ID are input to the access path controller 20 which operates to control the crossbar switch 300 to couple the identified requester 12 to the identified resource 16 by closing a path between one of buses 301-302 and one of buses 303-306.

The crossbar switch arrangement greatly enhances the speed of operation of the overall system since the crossbar switch 300 can operate to form multiple couplings at the same time such that several requesters can communicate with several resources simultaneously. Indeed, the crossbar switch 300 provides a potential coupling path between each requester and each resource via buses 301-302 and buses 303-306. Thus, when a particular requester wins access to a particular resource through the operation of the resource arbiter 10, the resource is necessarily free and the crossbar switch 300 can be operated by the access path controller 20 to immediately couple the particular requester to the particular resource while maintaining other couplings between different requesters and resources. The crossbar switch 300 can support multiple connections between requesters and resources.

The easy and natural scaling of the present invention to large numbers of requesters, large numbers of resource types, and large numbers of instances of various resource types will now be described.

The number of requesters in the system can be doubled by simply increasing the length of a few registers by one bit. And further, the number of requesters can again be doubled by adding another bit to the length of the registers, and so forth.

As a first example, the embodiment of the invention shown in FIG. 3 may have the number of requesters' that the arbiter can handle doubled by increasing the length of Requester ID Register 58 by one bit. And in order to double the length of the queues supported by the arbiter, Queue Position Register 56, Next Available Queue Position Register 74, and Current Queue Position Register 72 must be each made one bit longer.

Also the number of resource types which the example of the arbiter shown in FIG. 3 can handle may be doubled by increasing the length of the following registers by one bit each: Resource Type Register 54 in the request logic circuits; and in the grant logic circuits Resource Type Register 76.

As a second example, the embodiment of the invention shown in FIG. 3D may have the number of requesters that the arbiter can handle doubled by increasing the length of Requester ID Register 58 by one bit. And the length of queues supported by the arbiter may be doubled by increasing the length of the following registers by one bit: Queue Position Register 200 in the request logic circuits; and Queue Length Register 202 in the grant logic circuits.

Also the number of resource types which the example of the arbiter shown in FIG. 3D can handle may be doubled by increasing the length of the following registers by one bit: Resource Type Register 54 in the request logic circuits; and in the grant logic circuits, Resource Type Register 76.

As a third example of scaling, the number of instances of all resource types may be doubled. In both the embodiment shown in FIG. 3 and the embodiment shown in FIG. 3D, the number of resources may be doubled by increasing the length of the following register by one bit, Resource ID Register 78 in the grant control logic circuits.

Additionally, the broadcast medium 50 for the broadcast medium must be capable of handling the longer register lengths; that is, in the examples of the invention shown in FIG. 3 and FIG. 3D request bus 44 with subarbiter 44 and grant bus 55 with subarbiter 46 must be able to handle the longer register lengths.

Figure 5:
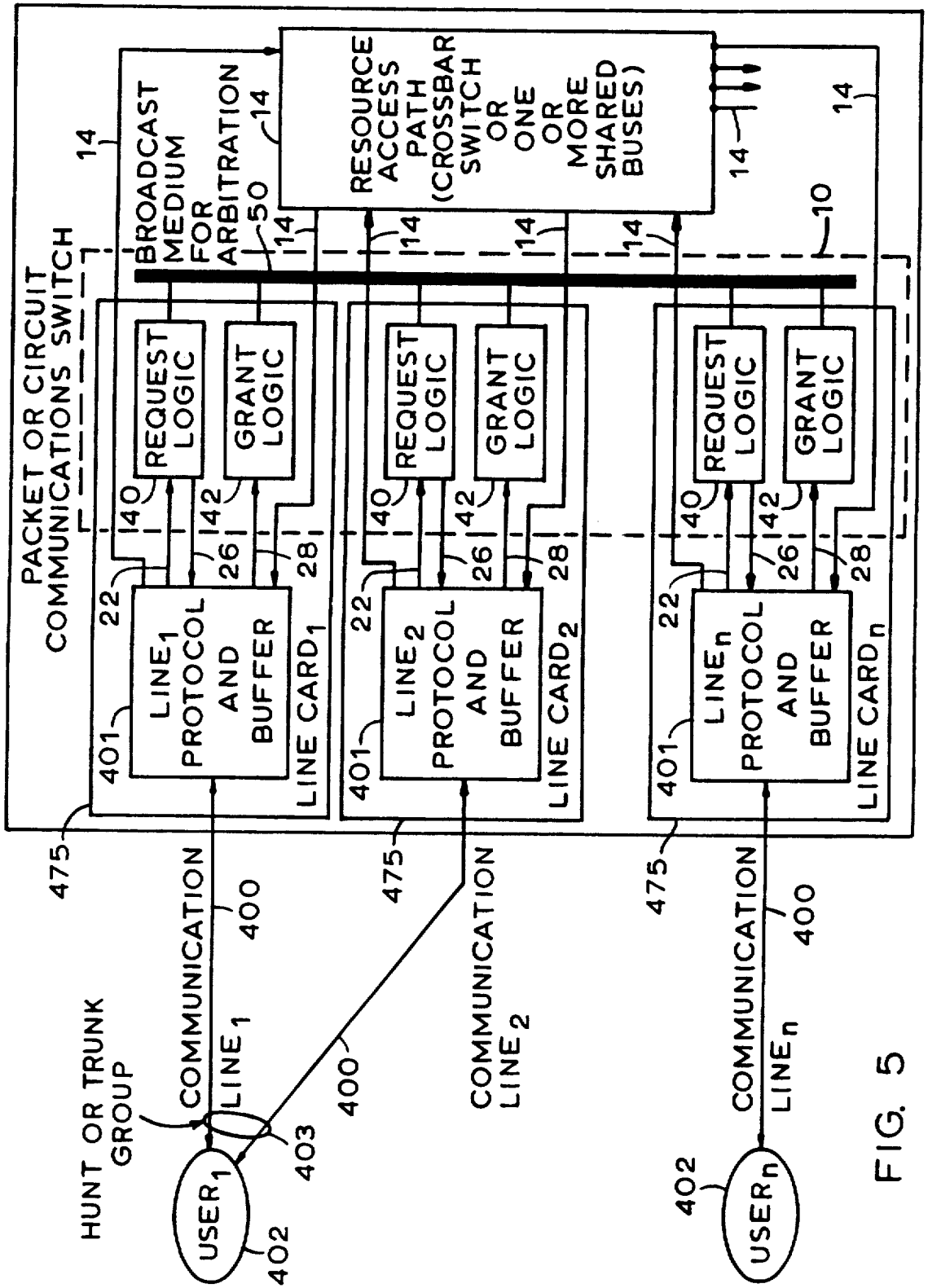
FIG. 5 is a block diagram of an electronic arbitration mechanism according to the present invention used in a packet or circuit communication switch.

Referring now to FIG. 5, there is illustrated an arbitration mechanism of the type illustrated in FIG. 1D specifically adapted to arbitrate access to a specific type of resource, namely, one of a plurality of communication lines 400. Each of the communication lines 400 couples a corresponding line protocol and buffer device 401 to a user station 402. Each of several communication lines 400 can form a hunt or a trunk group 403, i.e. each of the communication lines 400 of the trunk group 403 is coupled, at one end, to a corresponding line protocol and buffer device 401 and all of the communication lines 400 of the trunk group 403 are coupled, at the other ends, to a single user station 402. In this arrangement, each user station 402 is considered a resource type and all of the communication lines 400 coupled to a particular user station 402 are considered resources within the resource type represented by the particular user station 402.

As illustrated in FIG. 5, each line protocol and buffer device 401 is coupled to a request logic block 40 and a grant logic block 42, as described above with respect to FIGS. 1D so that the associated communication line 400 can be either a requester or a resource. Each request logic block 40 and grant logic block 42 is, in turn, coupled to a common broadcast medium 50. The request logic blocks 40, grant logic blocks 42 and common broadcast medium 50 can operate pursuant to anyone of the systems of FIGS. 3, 3d, and 4 to arbitrate the order of coupling between any one communication line 400 and any other communication line 400. The coupling between particular communication lines 400 is achieved through the corresponding line protocol and buffer devices 401 which are each coupled to a resource access path 14. The resource access path 14 may comprise, for example, a crossbar switch or one or more shared buses as illustrated in FIGS. 1 and 4. The control of the resource access path 14 after the resource ID and requester ID information is placed on the common broadcast medium during cycle 4 can be as described above with respect to any one of FIGS. 1, 1a or 1b.

Moreover, as also illustrated in FIG. 5, a plug-in logic board 475 can be used to couple resources/requesters via a distributed implementation of resource arbiter 10. The logic board 475 includes a request logic block 40 and a grant logic block 42 which are coupled to the broadcast medium 50 and to access path 14. Plug-in logic boards 475 provide a convenient method of connecting requesters and resources to each other. For example, the broadcast medium 50 and access connection 14 may be in a backplane bus in an ordinary electronic circuit card cage. As a further example shown in FIG. 5, a single entity may be both a requester and a resource, as for example a communications line 400. And by using a plug-in line card 475 into a backplane bus in an ordinary electronic card cage makes a particularly convenient method of adding communications lines.

Figure 6:
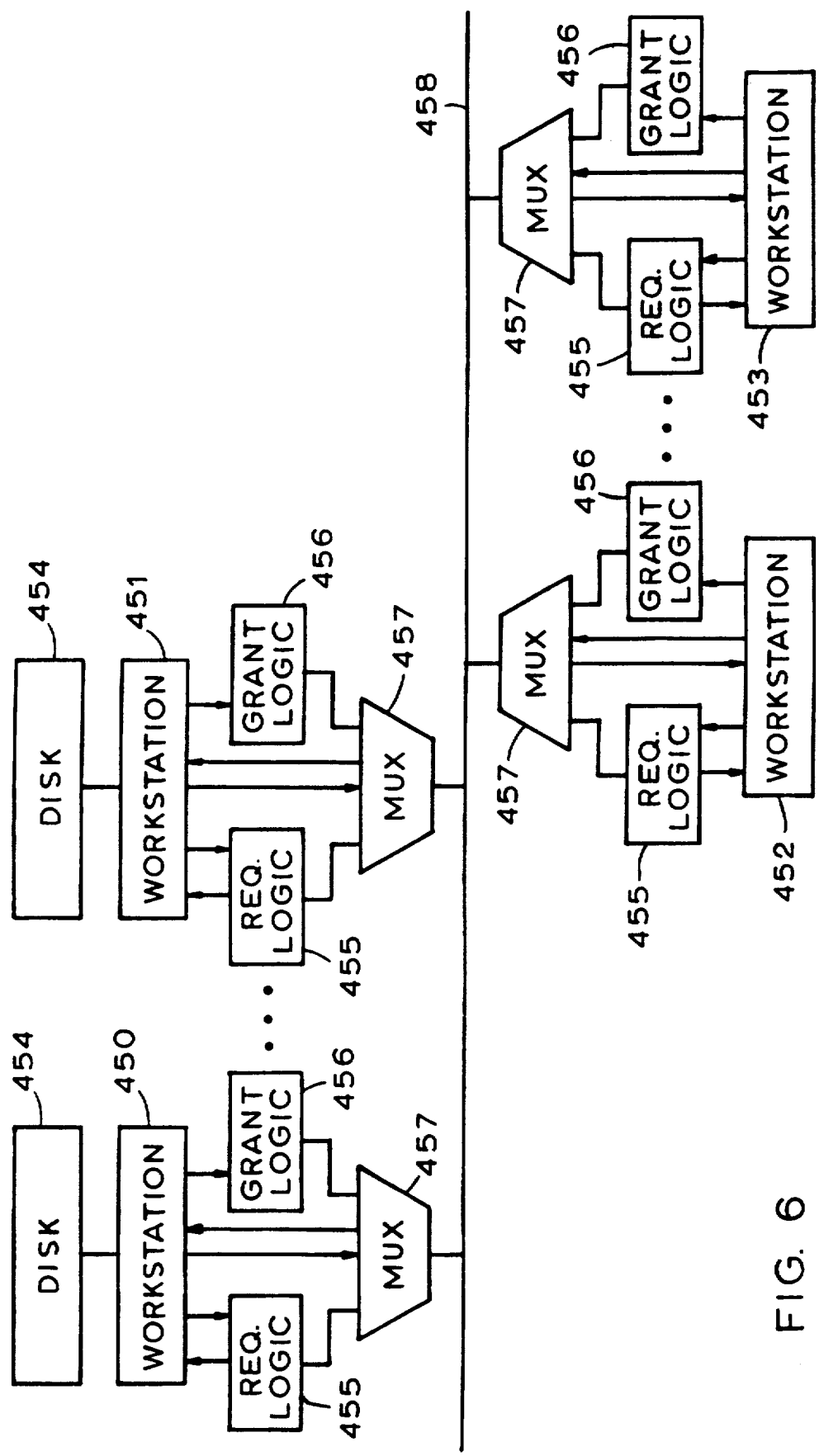
FIG. 6 is a block diagram of an electronic arbitration mechanism according to the present invention used in a distributed workstation system having a common bus.

Referring now to FIG. 6, there is illustrated in block diagram form a distributed workstation system incorporating the arbitration mechanism of the present invention. A plurality of workstations 450, 451, 452, 453 are partitioned according to the type of service each workstation 450-453 is to provide to users of the entire system. For example, workstations 450, 451 can each be coupled to a large disk system 454 to provide data base services, while workstations 452, 453 are dedicated to batch job processing. Any number of other workstations may be included in the system and assigned any number of different services to be made available to users of the system.

Each workstation 450-453 is coupled to a request logic block 455 and a grant logic block 456. In addition, each workstation 450-453 and its associated request logic block 455 and grant logic block 456 are coupled to inputs of a multiplexer 457, which combines messages from these sources. An output of each multiplexer 457 is coupled to a common bus medium 458 such as an Ethernet LAN.

Each request logic block 455 and grant logic block 456 may comprise a request logic block 40 and grant logic block 42, as illustrated in either of FIGS. 3 and 3a, respectively. The logic blocks 455, 456 operate according to the four cycle mode of operation described above with respect to FIGS. 3 and 3a, respectively, to arbitrate the order of coupling between any one workstation 450-453 which requests a type of service and one of the workstations which provides the requested service. Of course, the resource type information transmitted from a particular workstation 450-453 to its associated grant logic block 455 will indicate the type of service required by the particular workstation 450-453. Examples of resource types include disk server, file server, licensed software server, etc.

The Ethernet Carrier-Sense-Multiple Access/Collision-Detect arbitration scheme described above can act as the grant bus and request bus arbiter for the arbitration mechanism. The multiplexers 457 combine messages onto the common bus medium 458 such that the necessary information needed by the request bus, grant bus and resource access path functions is supplied to arbitrate the order of coupling between the workstations and to selectively couple the workstations for communication between selected requester and resource workstations.

All of the functionality provided by the logic blocks 455, 456 and the multiplexer 457 associated with a workstation 450-453 can be implemented in software executed by the workstation 450-453.

The arbitration scheme of the present invention, particularly as illustrated in FIG. 6, can also be used in a multi-processor system wherein CPUs and I/O devices are partitioned into resource types corresponding to tasks. The CPU's and I/O devices are the resources, the tasks are the resource types and any appropriate communication path of the multi-processor system, such as the backplane bus, is the resource access path.

In addition, each one of a set of disk drives, which together support multiple copies of a disk volume for enhanced performance and reliability, can be a resource. The resource type would then be the entire set of disk drives supporting the multiple copies. Writes to all disk drives in the set would be synchronized in accordance with known procedures so that each disk drive of the set contains the same data. Read requests to the set would be arbitrated in accordance with the arbitration scheme of the present invention to grant access to one of the disk drives (the resource) in the set (the resource type). When a cross bar switch is used as the resource access path, as in the embodiment of FIG. 4, several disk reads and a new read request arbitration could be in progress simultaneously.

A still further example of the invention is provided by a modification of Example 2 hereinabove, and provides a last in first out queuing discipline. During Cycle 2, as additional requests for the resource type are broadcast, the request logic circuits increment their stored queue positions. The first-in requester then will have the largest stored queue position, and will therefore be the last requester to be served by an instance of the requested resource type. This example provides a first in last out queuing discipline.

An even further example of the arbiter is given by implementing an algorithm during Cycle 2 to select, a desired ticket number as in Example 1. The algorithm, along with action of the request logic circuits, may be arranged to implement a great range of queuing disciplines.

It is to be understood that the above-described embodiments are simply illustrative of the principles of the invention. Various other modification and changes may be made by those skilled in the art which will embody the principles of the invention and fall within the spirit and scope thereof.

What is claimed is:

1. Apparatus for arbitrating access among a plurality of requesters and a plurality of types of resources, each said type of resource having at least one instance, comprising:

a request logic circuit coupled to each said requester, thereby forming a plurality of said request logic circuits;

a grant logic circuit coupled to each said instance of said plurality of types of resources, thereby forming a plurality of said grant logic circuits;

a broadcast medium for transferring information among said plurality of request logic circuits and said plurality of grant logic circuits;

means, responsive to a selected one of said requesters desiring to use a preselected type of resource, for said request logic circuit coupled to said selected requester to broadcast a request onto said broadcast medium for said preselected type of resource;

means, responsive to said broadcast of said request, for a first grant logic circuit to broadcast queue position information on said broadcast medium for said preselected type of resource, said queue position information for said preselected type of resource is hereinafter referred to as a first queue position information;

means, responsive to said broadcast of said first queue position information, for said request logic circuit coupled to said selected requester to store said first queue position information, said stored queue position information hereinafter referred to as a second queue position information;

means, responsive to an instance of said preselected type of resource becoming free and prepared to serve a requester, for a second grant logic circuit to broadcast on said broadcast medium an indication that a free instance of said preselected type of resource is prepared to serve a requester, said indication that a free instance of said preselected type of resource is prepared to serve a requester is hereinafter referred to as a third queue position information;

means, responsive to said second queue position information and responsive to said third queue position information, for granting access to said selected one of said requesters to use said free instance of said preselected type of resource.

2. The apparatus as in claim 1 further comprising:
said queue position information further comprises a ticket number for said preselected resource;
said means for granting access to said selected one of said requesters to use said free instance of said preselected type of resource grants said access in response to said second queue position information corresponding to said third queue position information.

3. The apparatus as in claim 2 wherein said corresponding is that said second queue position information equals said third queue position information, whereby a stored ticket number of said second queue position information equals a broadcast ticket number of said third queue position information.

4. T apparatus as in claim 1 further comprising:
said first queue position information is a queue position for a next customer and said third queue position information is an indication of the type of resource having a free instance;
said means for granting access to said selected one of said requesters to use said preselected type of resource grants said access in response to said request logic circuit coupled to said selected one of said requesters counting said third queue position information indicating that an instance of said preselected type of resource has become free, and in response to a result of said counting corresponding to said second queue position.

5. The apparatus as in claim 4 further comprising:
said counting by said means for granting access is done by decrementing said second queue position information;
said access is granted when a decremented value of said second queue position information equals a predetermined number.

6. The apparatus as in claim 5 wherein said predetermined number is zero.

7. The apparatus as in claim 1 wherein said queue position information is a number, and said numbers are issued substantially in serial ascending order, whereby access is granted to said requesters in a first in first out queuing discipline.

8. The apparatus as in claim 1 wherein said second queue position information is incremented by said request logic circuit in response to a broadcast on said broadcast medium of a new queue position information for said preselected type of resource, whereby access is granted to said requesters in a last in first out queuing discipline.

9. The apparatus in claim 1 further comprising:
means for selecting said queue position information in order to make a desired queuing discipline.

10. The apparatus as in claim 1 further comprising:
said request broadcast by said selected one of said requesters desiring to use a preselected type of resource has a priority information component, whereby said requesters are serviced on a priority basis queuing discipline.

11. The apparatus as in claim 1 further comprising:
means for designating one grant logic circuit, of those grant logic circuits coupled to instances of said preselected type of resource, as said first grant logic circuit to respond to said request for said preselected type of resource, said first grant logic circuit hereinafter referred to as said designated grant logic circuit.

12. The apparatus as in claim 11 further comprising:
means for at least one grant logic circuit, of those grant logic circuits coupled to instances of said preselected type of resource and not selected as said designated grant logic circuit, to monitor operation of said apparatus and to inform said apparatus in the event that said monitoring detects an error.

13. The apparatus as in claim 1 further comprising:
a subarbiter to arbitrate access to said broadcast medium by said plurality of request logic circuits and said plurality of grant logic circuits, whereby broadcasting on said broadcast medium is facilitated.

14. The apparatus as in claim 13 wherein said subarbiter selects a free instance of said type of resource in the event that more that one instance of said type of resource is available to serve said selected one of said requesters.

15. The apparatus as in claim 1 wherein said second grant logic circuit is associated with said free instance of said preselected type of resource.

16. The apparatus as in claim 1 fur comprising:
means for preventing said broadcast of said third queue position information indicating that an instance of a particular type of resource is free in the event that there is no pending request for said particular type of resource.

17. The apparatus as in claim 1 further comprising:
means for maintaining more than one queue for access to a particular said type of resource and for servicing different of said more than one queue on a priority queuing discipline.

18. The apparatus as in claim 1 wherein said means for granting access to said selected one of said requesters to use said free instance of said preselected type of resource further comprises an access path.

19. The apparatus as in claim 18 wherein said access path further comprises a crossbar switch.

20. The apparatus as in claim 18 wherein said access path further comprises at least one shared bus.

21. The apparatus as in claim 20 wherein said at least one shared bus further comprises a plurality of shared buses.

22. The apparatus as in claim 18 wherein said access path further comprises a multiplexer and a common bus.

23. The apparatus as in claim 22 wherein said common bus further comprises an ethernet local area network.

24. The apparatus as in claim 1 further comprising:
said resources further comprises a plurality of central processor units in a multiprocessor computer system and said access path further comprises a backplane bus for said plurality of central processor units.

25. The apparatus as in claim 1 further comprising:
both said requesters and said resources further comprise communications circuits, and said access path further comprises means for interconnecting said communications circuits.

26. The apparatus as in claim 25 wherein said means for interconnecting said communications circuits further comprises a crossbar switch.

27. The apparatus as in claim 25 wherein said communications circuits further comprise telephone circuits.

28. The apparatus as in claim 25 wherein said types of resources further comprise hunt groups of said communications circuits, and said instances of a type of resource further comprise individual communications circuits of said hunt groups.

29. The apparatus as in claim 1 wherein said broadcast medium further comprises at least one bus.

30. The apparatus as in claim 29 further comprising a subarbiter to arbitrate access to said at least one bus.

31. The apparatus as in claim 29 further comprising:
said at least one bus further comprises two buses, said two buses being a request bus and a grant bus;
a first subarbiter for granting access to said request bus;
a second subarbiter for granting access to said grant bus.

32. The apparatus as in claim 29 wherein said at least one bus further comprises an ethernet shared bus.

33. Apparatus for arbitrating access among a plurality of requesters and a plurality of resources, comprising:
a request logic circuit coupled to each said requester, thereby forming a plurality of said request logic circuits;
a grant logic circuit coupled to each said resource, thereby forming a plurality of said grant logic circuits;
a broadcast medium for transferring information among said plurality of request logic circuits and said plurality of grant logic circuits;
means, responsive to a selected one of said requesters desiring to use a preselected resource, for said request logic circuit coupled to said selected requester to broadcast a request onto said broadcast medium for said preselected type of resource;
means, responsive to said broadcast of said request, for a first grant logic circuit to broadcast queue position information on said broadcast medium for said preselected resource, said queue position information for said preselected resource is hereinafter referred to as a first queue position information;
means, responsive to said broadcast of said first queue position information, for said request logic circuit coupled to said selected requester to store said first queue position information, said stored queue position information hereinafter referred to as a second queue position information;
means, responsive to said preselected resource becoming free and prepared to serve a requester, for a second grant logic circuit to broadcast on said broadcast medium an indication that said preselected resource is prepared to serve a requester, said indication that said preselected resource is prepared to serve a requester is hereinafter refered to as a third queue position information;
means, responsive to said second queue position information and responsive to said third queue position information, for granting access to said selected one of said requesters to use said preselected resource.

* * * * *